(12) United States Patent
Gagnon (10) Patent No.: US 10,873,999 B2
(45) Date of Patent: *Dec. 22, 2020

(54) ENVIRONMENT CONTROLLER AND METHOD FOR PROPORTIONALLY ADJUSTING THE LIGHT INTENSITY OF SEVERAL LIGHTING DEVICES

(71) Applicant: Distech Controls Inc., Brossard (CA)

(72) Inventor: Dominic Gagnon, St-Bruno-de-Montarville (CA)

(73) Assignee: DISTECH CONTROLS INC., Brossard (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,996

(22) Filed: Nov. 5, 2019

(65) Prior Publication Data

US 2020/0068681 A1 Feb. 27, 2020

Related U.S. Application Data

(63) Continuation of application No. 16/059,366, filed on Aug. 9, 2018, now Pat. No. 10,506,681.

(51) Int. Cl.
*H05B 45/10* (2020.01)
*H05B 39/04* (2006.01)
*H05B 45/20* (2020.01)
*H05B 47/10* (2020.01)

(52) U.S. Cl.
CPC ........... *H05B 45/10* (2020.01); *H05B 39/042* (2013.01); *H05B 45/20* (2020.01); *H05B 47/10* (2020.01)

(58) Field of Classification Search
CPC ........ H05B 45/10; H05B 45/20; H05B 47/10; H05B 33/0845; H05B 33/0851; H05B 39/042

See application file for complete search history.

(56) References Cited

U.S. PATENT DOCUMENTS

| 6,118,231 | A | 9/2000 | Geiginger et al. |
| 8,890,946 | B2 | 11/2014 | Publicover et al. |
| 9,345,109 | B2 * | 5/2016 | Briggs ................... H05B 45/00 |

(Continued)

OTHER PUBLICATIONS

Entire prosecution history of U.S. Appl. No. 16/059,366, filed Aug. 9, 2018.

*Primary Examiner* — Borna Alaeddini
(74) *Attorney, Agent, or Firm* — RatnerPrestia (57) ABSTRACT

Environment controller and method for proportionally adjusting a respective light intensity of a plurality of lighting devices. The environment controller determines a current light intensity for each one of the plurality of lighting devices; and determines a current average light intensity by calculating the average of the current light intensities. The environment controller determines a target average light intensity; and determines a new light intensity for each one of the plurality of lighting devices, by proportionally adjusting the light intensity of each one of the plurality of lighting devices from its respective current light intensity to its respective new light intensity, so that the average of the new light intensities is equal to the target average light intensity. The current and new light intensities may be expressed as a percentage; and the target average light intensity received from a computing device or via a user interaction with the environment controller.

19 Claims, 4 Drawing Sheets

(56) References Cited

U.S. PATENT DOCUMENTS

| | | | |
|---|---|---|---|
| 2010/0300856 A1* | 12/2010 | Pance | G02B 6/0001 |
| | | | 200/314 |
| 2011/0069079 A1* | 3/2011 | Wang | G01J 1/26 |
| | | | 345/589 |
| 2012/0206050 A1 | 8/2012 | Spero | |
| 2013/0198670 A1 | 8/2013 | Pelletier et al. | |
| 2014/0312777 A1* | 10/2014 | Shearer | H05B 45/20 |
| | | | 315/151 |

* cited by examiner

ENVIRONMENT CONTROLLER AND METHOD FOR PROPORTIONALLY ADJUSTING THE LIGHT INTENSITY OF SEVERAL LIGHTING DEVICES

CROSS-REFERENCE TO RELATED APPLICATIONS

This is a Continuation Application of U.S. patent application Ser. No. 16/059,366, filed Aug. 9, 2018, now allowed, the disclosure of which is incorporated herein by reference in its entirety for all purposes.

TECHNICAL FIELD

The present disclosure relates to the field of building automation, and more precisely environmental condition control in an area of a building. More specifically, the present disclosure presents an environment controller and a method for proportionally adjusting the light intensity of several lighting devices.

BACKGROUND

Systems for controlling environmental conditions, for example in buildings, are becoming increasingly sophisticated. An environment control system may at once control heating and cooling, monitor air quality, adjust lighting, detect hazardous conditions such as fire, carbon monoxide release, intrusion, and the like. Such environment control systems generally include at least one environment controller, which receives measured environmental values, generally from sensors, and in turn determines set-points or command parameters to be sent to controlled appliances.

The environment controller and the devices under its control (sensors, controlled appliances, etc.) are generally referred to as Environment Control Devices (ECDs). An ECD comprises processing capabilities for processing data received via one or more communication interface and/or generating data transmitted via the one or more communication interface.

An example of controlled appliance consists of a light controller, which has one or more lighting device (e.g. lamps) under its control. The environment controller is capable of switching on or off the lighting device(s), and further adjusting the light intensity of the lighting device(s), by sending commands to the light controller.

When a plurality of lighting devices is present in an area, the environment controller is capable of determining a current average light intensity for the area, receiving a target average light intensity for the area, and adjusting the respective light intensities of the plurality of lighting devices to reach the target average light intensity for the area.

A simple way to proceed is to set the light intensity of each one the plurality of lighting devices to the target average light intensity for the area. However, this simple solution does not take into consideration the current values of the light intensity of each one the plurality of lighting devices. The result may be an abrupt adjustment of some of the current values, which is not comfortable for persons located in the vicinity of a lighting device having its lighting intensity abruptly adjusted. For example, if the current light intensity of a given lighting device is 25% of the maximum light intensity, the current average light intensity of the area is 40% and the target average light intensity of the area is 70%, then the adjustment from 25% to 70% of the light intensity of the given lighting device may be considered uncomfortable by some of the persons close to the given lighting device. A better way to proceed with the adjustments (to preserve the comfort of persons affected by the adjustments) is to take into consideration (in combination) the current values of the light intensities of the lighting devices in the area.

Therefore, there is a need for an environment controller and a method for proportionally adjusting the light intensity of several lighting devices.

SUMMARY

According to a first aspect, the present disclosure relates to an environment controller for proportionally adjusting a respective light intensity of a plurality of lighting devices. The environment controller comprises a processing unit. The processing unit determines a current light intensity for each one of the plurality of lighting devices. The processing unit determines a current average light intensity by calculating the average of the current light intensities. The processing unit determines a target average light intensity. The processing unit determines a new light intensity for each one of the plurality of lighting devices. The determination is made by proportionally adjusting the light intensity of each one of the plurality of lighting devices from its respective current light intensity to its respective new light intensity, so that the average of the new light intensities is equal to the target average light intensity.

According to a second aspect, the present disclosure relates a method for proportionally adjusting a respective light intensity of a plurality of lighting devices. The method comprises determining, by a processing unit of an environment controller, a current light intensity for each one of the plurality of lighting devices. The method comprises determining, by the processing unit of the environment controller, a current average light intensity by calculating the average of the current light intensities. The method comprises determining, by the processing unit of the environment controller, a target average light intensity. The method comprises determining, by the processing unit of the environment controller, a new light intensity for each one of the plurality of lighting devices. The determination is made by proportionally adjusting the light intensity of each one of the plurality of lighting devices from its respective current light intensity to its respective new light intensity, so that the average of the new light intensities is equal to the target average light intensity.

According to a third aspect, the present disclosure relates to a non-transitory computer program product comprising instructions executable by a processing unit of an environment controller. The execution of the instructions by the processing unit of the environment controller provides for proportionally adjusting a respective light intensity of a plurality of lighting devices, by implementing the aforementioned method.

According to a fourth aspect, the present disclosure relates a method for proportionally adjusting a respective set point of a plurality of controlled appliances. The method comprises determining, by a processing unit of an environment controller, a current set point for each one of the plurality of controlled appliances. The method comprises determining, by the processing unit of the environment controller, a current average set point by calculating the average of the current set points. The method comprises determining, by the processing unit of the environment controller, a target average set point. The method comprises determining, by the processing unit of the environment controller, a new set point for each one of the plurality of controlled appliances. The determination is made by proportionally adjusting the set point of each one of the plurality of controlled appliances from its respective current set point to its respective new set point, so that the average of the new set points is equal to the target average set point.

In a particular aspect, the current average light intensity (or the current average set point) is transmitted to a computing device via a communication interface of the environment controller; and the determination of the target average light intensity (or the target average set point) comprises receiving the target average light intensity (or the target average set point) from the computing device via the communication interface of the environment controller.

In another particular aspect, the current average light intensity (or the current average set point) is displayed on a display of the environment controller; and the determination of the target average light intensity (or the target average set point) comprises receiving the target average light intensity (or the target average set point) from a user via a user interface of the environment controller.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for adjusting the light intensities of a plurality of lighting devices located in an area of the building under the control of an environment controller. The adjustments aim at changing the average light intensity of the area from a current value to a new value, in a manner that takes into account the current light intensities of each one of the plurality of lighting devices.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, $CO_2$, flow, radiation, water level, speed, sound; a variation of at least one of the following, temperature, pressure, humidity and lighting, $CO_2$ levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Relay: device capable of relaying an environmental characteristic value from a sensor to an environment controller and/or relaying a command from an environment controller to a controlled appliance.

Environmental state: a current condition of an environment based on an environmental characteristic, each environmental state may comprise a range of values or verifiable representation for the corresponding environmental characteristic.

Area of a building: the expression 'area of a building' is used throughout the present specification to refer to the interior of a whole building or a portion of the interior of the building such as, without limitation: a floor, a room, an aisle, etc.

Referring now concurrently to FIGS. 1, 2, 3 and 4, an environment controller 100 and a method 500 for proportionally adjusting a respective light intensity of a plurality of lighting devices are illustrated.

Figure 1:
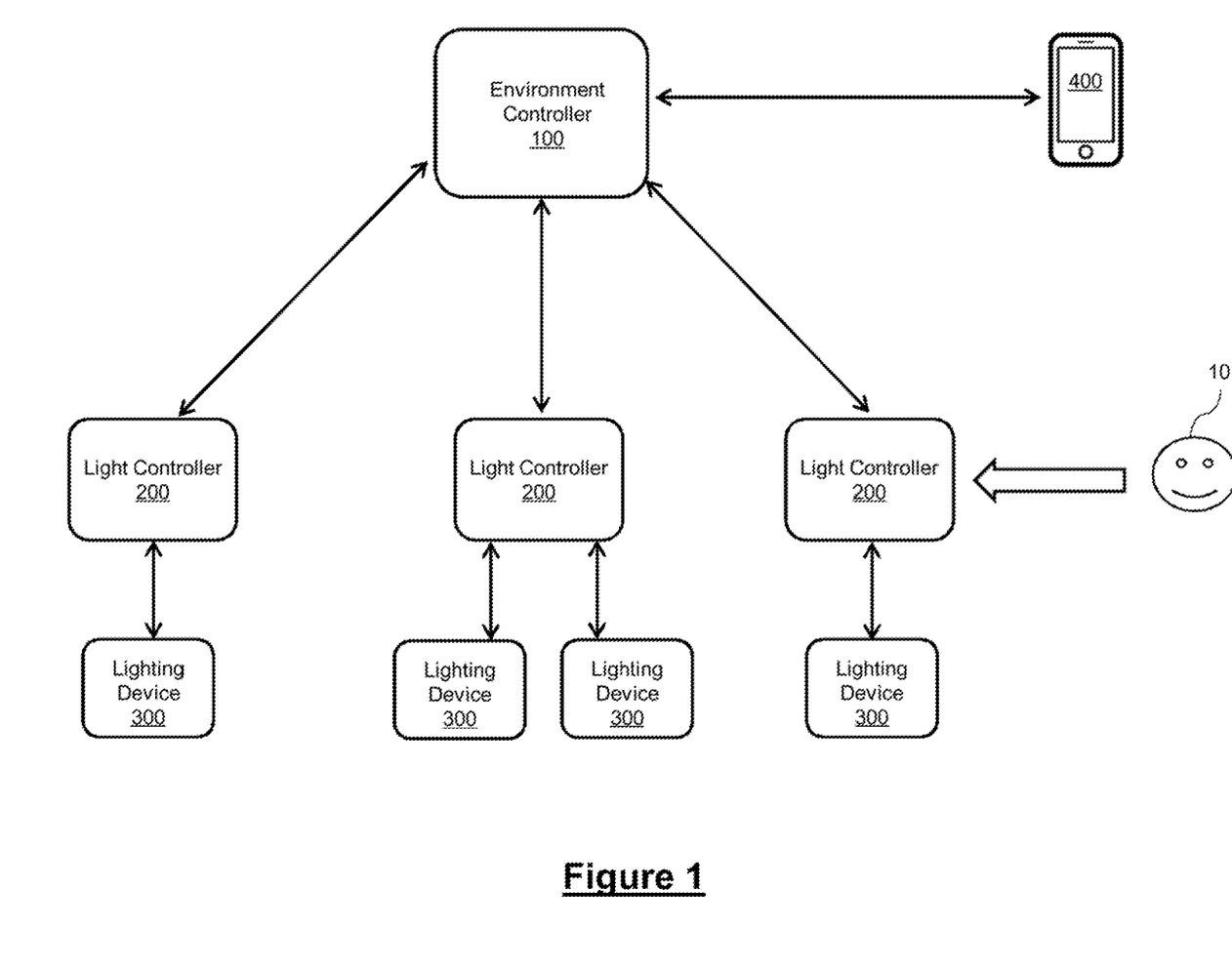
FIGS. 1 and 2 represent an environment control system comprising an environment controller interacting with a user device and a plurality of light controllers respectively controlling one or more lighting device.
Figure 2:
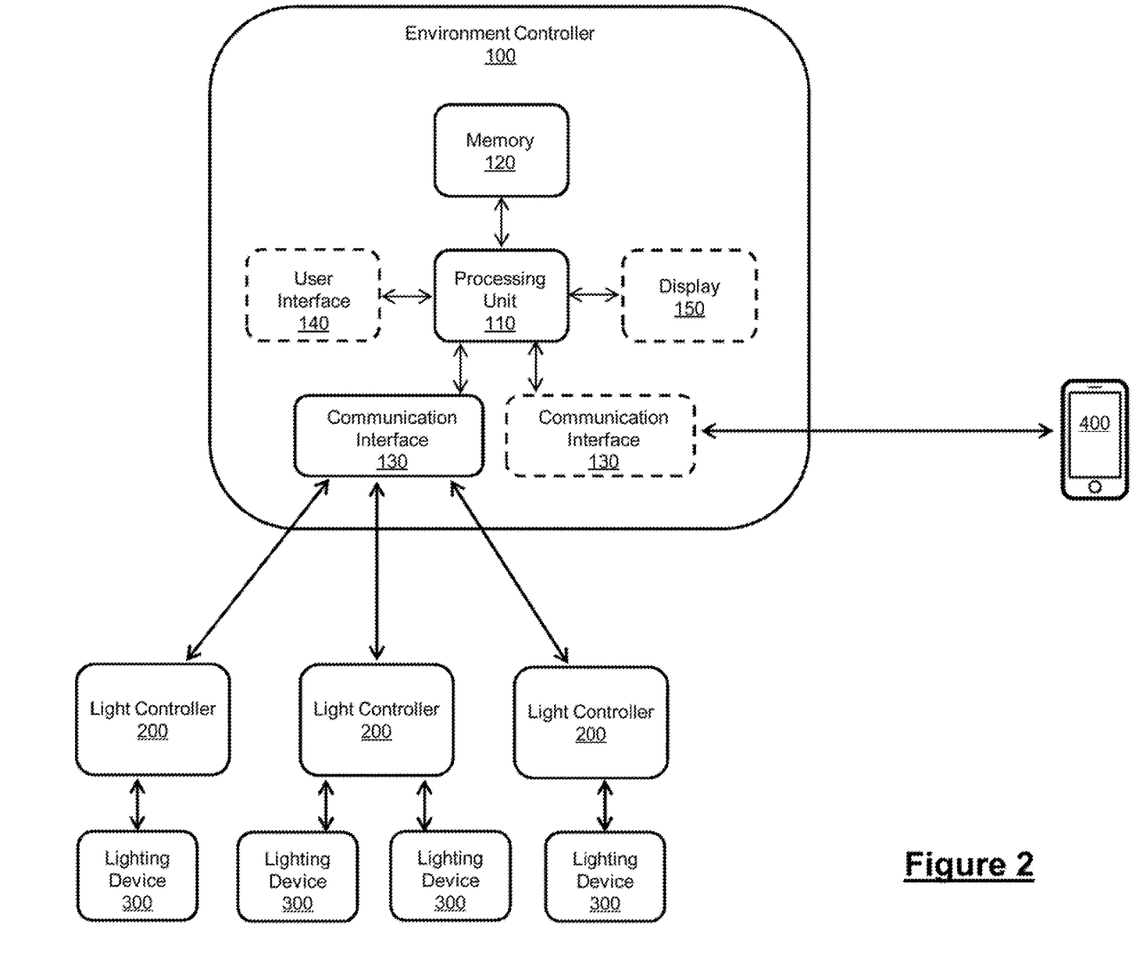

FIGS. 1 and 2 represent an environment control system, where an environment controller 100 exchanges data with other environment control devices (ECDs). The environment controller 100 is responsible for controlling the environment of an area of a building. An environment controller such as the one represented in FIG. 1 generally receives environment characteristic values measured by sensors. The environment controller generates commands based on the received environment characteristic values. The generated commands are transmitted to controlled appliances (to control the operations of the controlled appliances).

The area under the control of the environment controller 100 is not represented in the Figures for simplification purposes. As mentioned previously, the area may consist of a room, a floor, an aisle, etc. (of a building). However, the area under the control of the environment controller 100 is not limited to being inside a building. Outdoor areas such as a street, a parking lot, a stadium, a private outdoor space surrounding a building, etc. also fall within the scope of the present disclosure.

FIG. 1 more specifically illustrates an environment control system where the environment controller 100 controls one or more light controller 200 located in a given area.

Three light controllers 200 have been represented in FIG. 1 for illustration purposes, but the environment controller 100 may control any number of light controller(s) 200. Each light controller 200 is in turn responsible for controlling one or more lighting device 300. Four lighting devices 300 have been represented in FIG. 1 for illustration purposes, but the environment controller 100 may control any number of lighting device(s) 300 via intermediate light controller(s) 200.

Examples of lighting devices 300 include various types of lamps which are deployed in an area of a building. In the context of the present disclosure, a lighting device 300 consists of any type of device capable of generating a light of variable intensity. Examples of light controllers 200 include a lamp switch allowing to switch on or off a lamp under the control of the lamp switch, and to further adjust the light intensity of the lamp under the control of the lamp switch.

The environment controller 100 sends commands to the light controller 200 responsible of a given lighting device 300, for switching on or off the given lighting device 300. The environment controller 100 further sends commands to the light controller 200 responsible of the given lighting device 300, for adjusting the light intensity of the given lighting device 300 to a given value.

In the general case, at least some of the light controllers 200 are also accessible by users 10, who have the capability to manually interact with the light controllers 200. Through this manual interaction, a user 10 can switch on or off a corresponding lighting device 300; and can also adjust the light intensity of the corresponding lighting device 300 to a given value.

In some cases, the environment controller 100 interacts directly with a given lighting device 300 without going through an intermediate light controller 200. In this configuration, the given lighting device 300 has an integrated light control functionality directly addressable by the environment controller 100.

The environment controller 100 also interacts with at least one user device 400. The user device 400 is a computing device with a user interface (e.g. a smartphone, a tablet, etc.). A user of the user device 400 has the capability to control the global lighting level in the area; but does not control the lighting devices 300 individually. As will be detailed later in the description, the environment controller 100 is in charge of determining the appropriate commands to be sent to the light controllers 200 for controlling the corresponding lighting devices 300, in order to meet the global lighting level in the area requested by the user of the user device 400.

Referring more specifically to FIG. 2, details of the environment controller 100, the user device 400 and the light controller 200 are provided.

The environment controller 100 comprises a processing unit 110, memory 120, and one or more communication interface 130. The environment controller 100 may comprise additional components, such as a user interface 140, a display 150, etc.

The processing unit 110 comprises one or more processors (not represented in FIG. 2) capable of executing instructions of a computer program. Each processor may further comprise one or several cores.

The memory 120 stores instructions of computer program (s) executed by the processing unit 110, data generated by the execution of the computer program(s), data received via the communication interface(s) 130, etc. Only a single memory 120 is represented in FIG. 2, but the environment controller 100 may comprise several types of memories, including volatile memory (such as a volatile Random Access Memory (RAM), etc.) and non-volatile memory (such as a hard drive, electrically-erasable programmable read-only memory (EEPROM), etc.).

Each communication interface 130 allows the environment controller 100 to exchange data with remote devices (e.g. the light controllers 200, the user device 400, etc.) over a communication network (not represented in FIG. 2 for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network, a Bluetooth® Low Energy (BLE) network, etc.

In an exemplary configuration, the environment controller 100 has a first communication interface 130 for exchanging data with the user device 400 (e.g. using the BLE standard) and a second communication interface 130 for exchanging data with the light controllers 200 (e.g. using one of the 802.11 standards).

The user device 400 comprises a processing unit, memory, and a communication interface. The communication interface of the user device 400 is used for exchanging data with the environment controller 100. The user device 400 also comprises a user interface and a display, for displaying the data received from the environment controller 110, and for generating the data transmitted to the environment controller 100. The user device 400 may comprise additional components, such as another communication interface, etc.

The components of the user device 400 have not been represented in FIG. 2 for simplification purposes.

The light controller 200 comprises a processing unit, memory, and a communication interface. The communication interface of the light controller 200 is used for exchanging data with the environment controller 100. The light controller 200 also comprises at least one actuation module (e.g. electrical or electronic actuation module) for controlling one or more lighting device 300 (switching on or off, adjusting the light intensity). The light controller 200 may comprise additional components, such as other actuation module(s), an integrated light sensor, etc.

The components of the light controller 200 have not been represented in FIG. 2 for simplification purposes.

Figure 3:
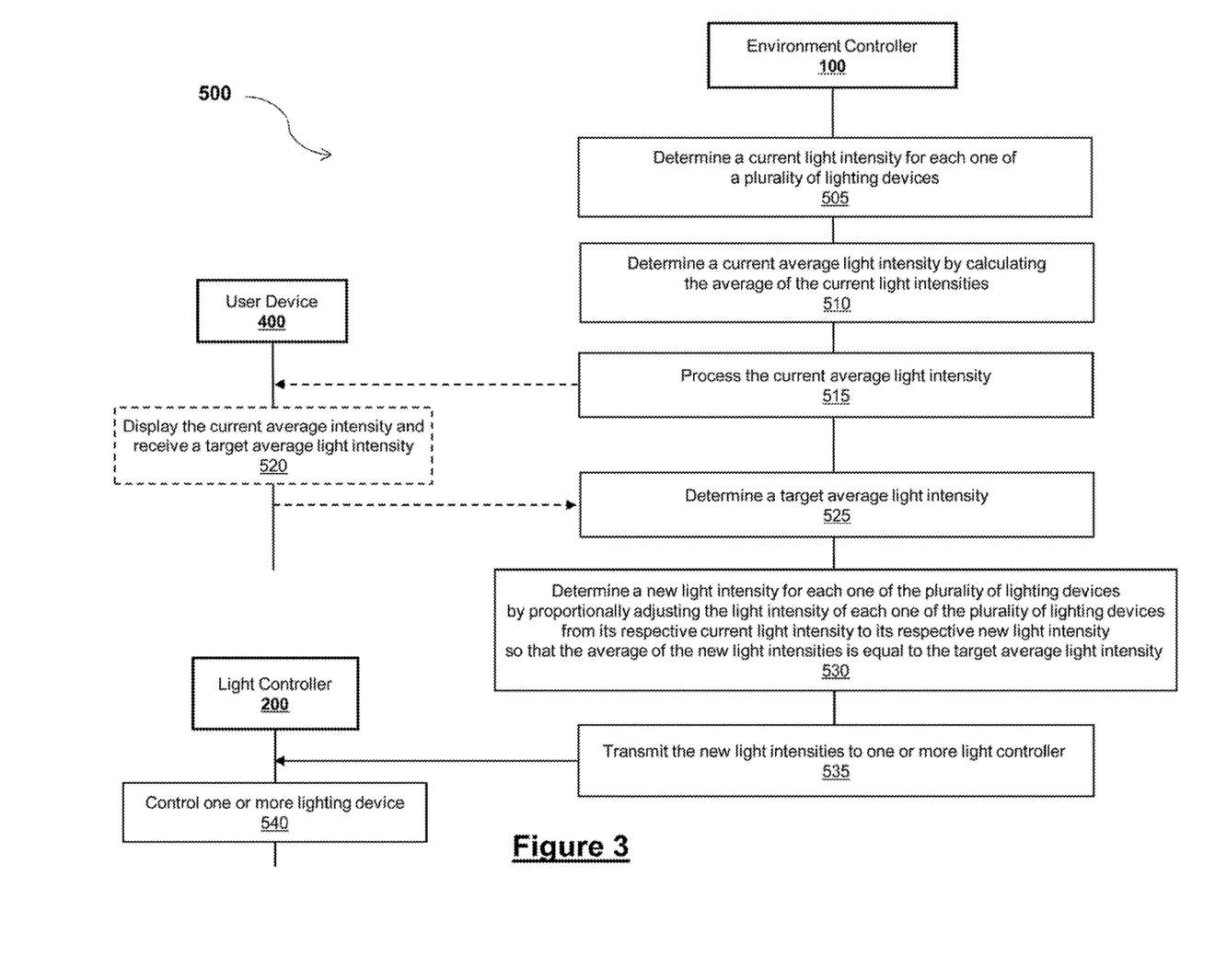
FIG. 3 represents a method implemented by the environment controller of FIGS. 1 and 2 for proportionally adjusting a respective light intensity of the of lighting devices of FIGS. 1 and 2.

Reference is now made more specifically to FIG. 3. At least some of the steps of the method 500 represented in FIG. 3 are implemented by the environment controller 100, for proportionally adjusting a respective light intensity of the plurality of lighting devices 300 of FIGS. 1 and 2.

A dedicated computer program has instructions for implementing at least some of the steps of the method 500. The instructions are comprised in a non-transitory computer program product (e.g. the memory 120) of the environment controller 100. The instructions provide for proportionally adjusting a respective light intensity of the plurality of lighting devices 300 of FIGS. 1 and 2, when executed by the processing unit 110 of the environment controller 100. The instructions are deliverable to the environment controller 100 via an electronically-readable media such as a storage media (e.g. CD-ROM, USB key, etc.), or via communication links (e.g. via a communication network through the communication interface 130).

The method 500 comprises the step 505 of determining a current light intensity for each one of the plurality of lighting devices 300. Step 505 is performed by the processing unit 110 of the environment controller 100.

In a first implementation of step 505, the current light intensity for each one of the plurality of lighting devices 300 is stored in the memory 120. Thus, the processing unit 110 simply retrieves the current light intensities from the memory 120. When new light intensities are determined at step 530, they are stored in the memory 120 and become the current light intensities for the next occurrence of step 505.

In a second implementation of step 505, the environment controller 100 sends a request to each light controller 200, and each light controller 200 responds to the request with the current light intensity of the one or more lighting device 300 under its control. This second implementation is more appropriate when the environment controller 100 is not the only entity capable of adjusting the light intensity of at least some of the lighting devices 300. For example, as illustrated in FIG. 1, the user 10 has the capability to adjust the light intensity of a lighting device 300 though direct interactions with its corresponding light controller 200. In this case, the environment controller 100 has no knowledge of the new value of the light intensity enforced by the user 10. The environment controller 100 needs to request this new value of the light intensity. The details of this second implementation (sending of the request and reception of the response) are not represented in FIG. 3 for simplification purposes.

The method 500 comprises the step 510 of determining a current average light intensity by calculating the average of the current light intensities. Step 510 is performed by the processing unit 110 of the environment controller 100.

For example, if four current light intensities have been determined at step 505, then the average light intensity is the average of these four current light intensities.

The method 500 comprises the step 515 of processing the current average light intensity (calculated at step 510). Step 515 is performed by the processing unit 110 of the environment controller 100. Step 515 can be implemented in different manners.

In a first implementation illustrated in FIG. 3, step 515 comprises transmitting the current average light intensity to the user device 400. The transmission is made via the communication interface 130 of the environment controller 100. If the environment controller 100 has several communication interfaces 130, one of them is used for interacting with the user device 400.

In this first implementation, the method 500 comprises the step 520 of displaying the current average light intensity and determining a target average light intensity. Step 520 is performed by the processing unit of the user device 400. The current average light intensity is displayed on the display of the user device 400, so that a user of the user device 400 can see/read it. The user of the user device 400 has the capability to set the target average light intensity via the user interface of the user device 400. For example, a graphical user interface consisting of a slider is used for displaying the current average light intensity (e.g. 40%). The slider is movable by the user of the user device 400 to change the value of the current average light intensity (e.g. 40%) into the value of the target average light intensity (e.g. 60%).

Although not represented in FIG. 3 for simplification purposes, the current average light intensity is received from the environment controller 100 via the communication interface of the user device 400. Similarly, the target average light intensity is transmitted to the environment controller 100 via the communication interface of the user device 400. If the user device 400 has several communication interfaces 130, one of them is used for interacting with the environment controller 100.

In a second implementation (not illustrated in FIG. 3 for simplification purposes), step 515 comprises displaying the current average light intensity on the display 150 of the environment controller 100.

Step 515 is generally performed (in the case of the first implementation) after the environment controller 100 receives a request from the user device 400 to transmit the current average light intensity. This request has not been represented in FIG. 3 for simplification purposes. For example, the request is received before performing step 505. Step 515 is generally performed (in the case of the second implementation) after the environment controller 100 receives a request from a user of the environment controller 100 (via its user interface 140) to display the current average light intensity Step 515 may also not be executed when the method 500 is performed. In this case, there is no display of the current average light intensity, either on the user device 400 or the environment controller 100.

The method 500 comprises the step 525 of determining the target average light intensity. Step 525 is performed by the processing unit 110 of the environment controller 100.

In the first implementation, step 525 comprises receiving the target average light intensity from the user device 400. The reception is made via the communication interface 130 of the environment controller 100.

In the second implementation, step 525 comprises receiving the target average light intensity from a user via the user interface 140 of the environment controller 100.

The second implementation can only be performed for an environment controller 100 comprising the user interface 140 and the display 150.

The method 500 comprises the step 530 of determining a new light intensity for each one of the plurality of lighting devices 300. The determination is made by proportionally adjusting the light intensity of each one of the plurality of lighting devices 300 from its respective current light intensity (determined at step 505) to its respective new light intensity, so that the average of the new light intensities is equal to the target average light intensity (determined at step 525). Step 530 is performed by the processing unit 110 of the environment controller 100.

Several algorithms can be implemented for performing step 530. An exemplary algorithm will be detailed later in the description.

The method 500 comprises the step 535 of transmitting the new light intensities (determined at step 530) to one or more light controller 200. Step 535 is performed by the processing unit 110 of the environment controller 100. The transmission is made via same the communication interface 130 used at steps 515 and 525; or via another communication interface 130 of the environment controller 100.

Each light controller 200 controls one or more lighting device 300. The new light intensities for the lighting devices 300 under the control of a given light controller 200 are transmitted to this given light controller 200 by the environment controller 100.

Figure 4:
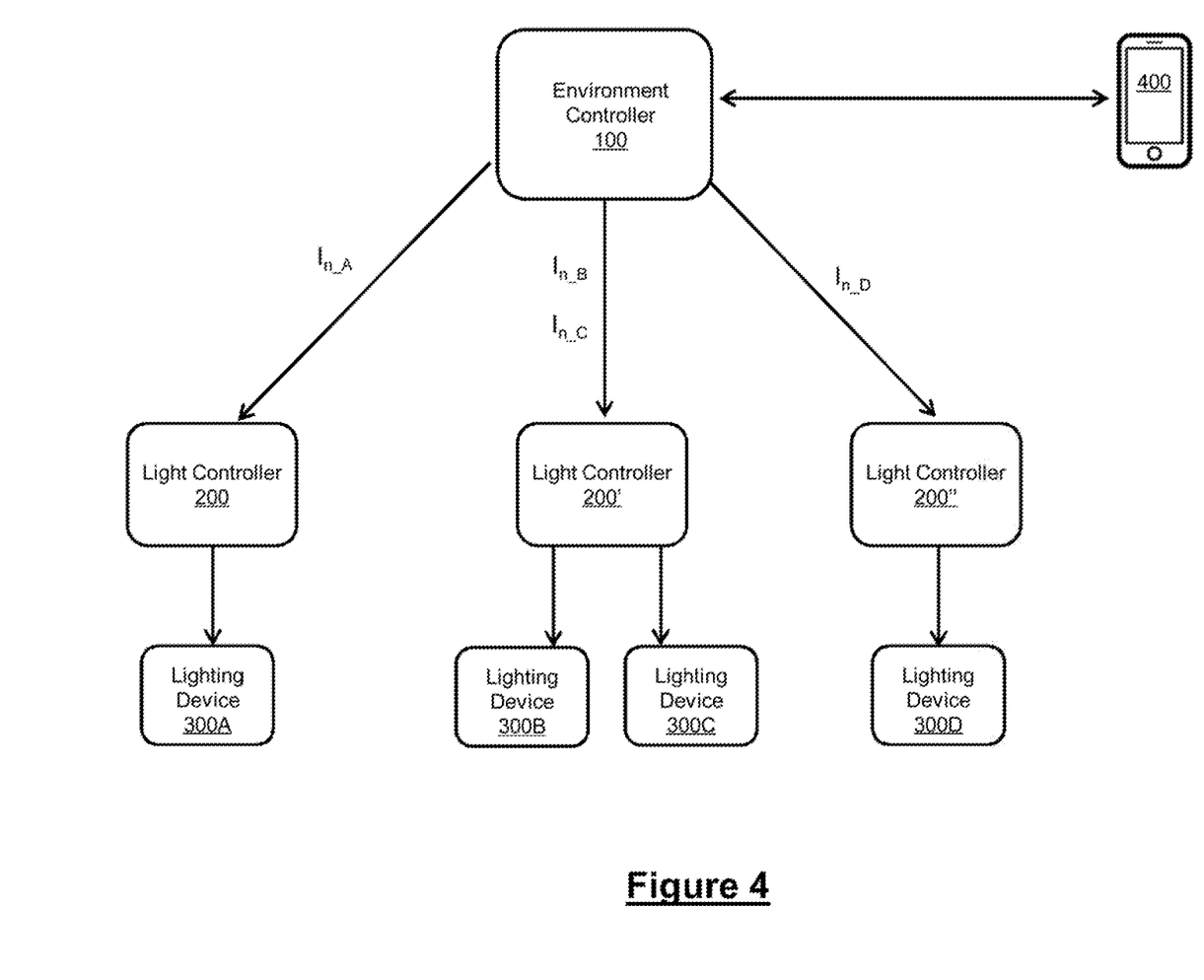
FIG. 4 illustrates the transmission of adjusted light intensities by the environment controller of FIGS. 1 and 2, the adjusted light intensities being determined via the method of FIG. 3.

FIG. 4 illustrates an exemplary configuration where light controller 200 controls lighting device 300A, light controller 200' controls lighting devices 300B and 300C, and light controller 200" controls lighting device 300D.

At step 530, the following new light intensities are determined: $I_{n\_A}$ for lighting device 300A, $I_{n\_B}$ for lighting device 300B, $I_{n\_C}$ for lighting device 300C, and $I_{n\_D}$ for lighting device 300D.

At step 535, the new light intensities are transmitted as follows: $I_{n\_A}$ to light controller 200, $I_{n\_B}$ and $I_{n\_C}$ to light controller 200', and $I_{n\_D}$ to light controller 200".

The method 500 comprises the step 540 of controlling one or more lighting device 300 based on the new light intensities transmitted at step 535. Step 540 is performed by a light controller 200. The new light intensities are received via the communication interface of the light controller 200. The processing unit of the light controller 200 controls the one or more lighting device 300 by activating one or more actuator (e.g. electrical or electronic actuator) of the light controller 200 to perform the adjustment of the light intensity of the one or more lighting device 300 according to the received new light intensities.

Step 540 is performed by the one or more light controller 200 responsible for controlling the lighting devices 300 mentioned at steps 505 and 530.

As mentioned previously, a light controller 200 controls a single or a plurality of lighting devices 300. Furthermore, a light controller 200 and a lighting device 300 may be integrated in a single device consisting of a lighting device with a light controller functionality.

Following is an exemplary algorithm for implementing step 530 of the method 500. This algorithm is for illustration purposes only. A person skilled in the art would be capable of designing other algorithm(s) for implementing step 530.

We consider the current light intensity $I_c$ determined at step 505 for a given lighting devices 300 among the plurality of lighting devices 300.

We consider the new light intensity $I_n$ determined at step 530 for the given lighting devices 300.

We consider the current average light intensity $A_c$ determined at step 510.

We consider the target average light intensity $A_t$ determined at step 525.

The current light intensity $I_c$ and the new light intensity $I_n$ are expressed as a percentage (0 to 100%). For example, each lighting device 300 uses energy (expressed in watts) to generate light having a given light intensity. The energy is adjustable from 0 to a maximum value $E_M$. The given light intensity corresponds to a given energy E and the percentage is calculated as $E/E_M$. For illustration purposes, if the energy varies from 0 to 100 watts, for an energy of 50 watts, the corresponding light intensity is 50%. In this example, the relationship between the energy and the corresponding light intensity is linear. However, the light intensity may also be generated as a non-linear function of the corresponding energy.

The algorithm implemented at step 530 consists of the following.

If the target average light intensity $A_t$ is greater than the current average light intensity $A_c$, then the new light intensity $I_n$ is calculated as follows: $I_n = I_c + (100 - I_c) * (A_t - A_c)/(100 - A_c)$.

If the target average light intensity $A_t$ is lower than the current average light intensity $A_c$, then the new light intensity $I_n$ is calculated as follows: $I_n = I_c + I_c * (A_t - A_c)/A_c$.

The algorithm is repeated for each one among the plurality of lighting devices 300.

Following is an exemplary application of the algorithm to the four lighting devices 300A, 300B, 300C and 300D represented in FIG. 4.

The current light intensity $I_c$ determined at step 505 for the lighting devices 300A, 300B, 300C and 300D is respectively 0%, 33% 67% and 100%.

The current average light intensity $A_c$ calculated at step 510 is 50%.

In a first scenario, we assume that the target average light intensity $A_t$ determined at step 525 is 60%.

The new light intensity $I_n$ determined at step 530 for the lighting device 300A is: 0%+(100%−0%)×(60%−50%)/(100%−50%)=20%.

The new light intensity $I_n$ determined at step 530 for the lighting device 300B is: 33%+(100%−33%)×(60%−50%)/(100%−50%)=46.4%.

The new light intensity $I_n$ determined at step 530 for the lighting device 300C is: 67%+(100%−67%)×(60%−50%)/(100%−50%)=73.6%.

The new light intensity $I_n$ determined at step 530 for the lighting device 300D is: 100%+(100%−100%)×(60%−50%)/(100%−50%)=100%.

The average of 20%, 46.4%, 73.6% and 100% is effectively $A_t$=60%.

In a second scenario, we assume that the target average light intensity $A_t$ determined at step 525 is 40%.

The new light intensity $I_n$ determined at step 530 for the lighting device 300A is: 0%+(0%)×(40%−50%)/(50%)=0%.

The new light intensity $I_n$ determined at step 530 for the lighting device 300B is: 33%+(33%)×(40%−50%)/(50%)=26.4%.

The new light intensity $I_n$ determined at step 530 for the lighting device 300C is: 67%+(67%)×(40%−50%)/(50%)=53.6%

The new light intensity $I_n$ determined at step 530 for the lighting device 300D is: 100%+(100%)×(40%−50%)/(50%)=80%

The average of 0%, 26.4%, 53.6% and 80% is effectively $A_t$=40%.

The present algorithm operates with the current light intensity $I_c$ and the new light intensity $I_n$ being defined as a percentage. However, another algorithm implementing step 530 may operate with the current light intensity $I_c$ and the new light intensity $I_n$ being defined as absolute values (e.g. expressed in watts to represent the energy used by the lighting devices 300 to generate light).

The present method is not limited to the lighting devices 300; but can be adapted to other types of controlled appliances (e.g. automated stores). The environment controller 100 controls each one of a plurality of controlled appliances via a set point (corresponding to the light intensity in the case of the lighting devices 300). As mentioned previously, the set point is expressed as a percentage or as an absolute value. For example, in the case of automated stores, the set point is a percentage representing an amount of light blocked by the store (0% for allowing all light through the automated store and 100% for allowing no light through the automated store).

At step 505, the environment controller 100 determines the current set point for each one of the controlled appliances.

At step 510, the environment controller 100 determines a current average set point by calculating the average of the current set points (determined at step 505).

At step 515, the environment controller 100 processes the current average set point.

At step 525, the environment controller 100 determines a target average set point.

The previously described implementations of steps 515 and 525 also apply to the processing of the current average set point and the determination of the target average set point.

At step 530, the environment controller 100 determine a new set point for each one of the plurality of controlled appliances by proportionally adjusting the set point of each one of the plurality of controlled appliances from its respective current set point to its respective new set point, so that the average of the new set points is equal to the target average set point.

At step 535, the environment controller 100 transmits the new set points to the controlled appliances. Each controlled appliance comprises at least one actuation module, to control the operations of the controlled appliance based on the new set point received from the environment controller 100. The actuation module may be of one of the following type: mechanical, pneumatic, hydraulic, electrical, electronical, a combination thereof, etc. A processing unit of the controlled appliance actuates the at least one actuation module based on the received new set point. Alternatively, the environment controller 100 transmits the new set points to one or more intermediate equipment (corresponding to the light controller 200) in charge of controlling the controlled appliances by applying the new set points to the controlled appliances.

The previously described algorithm for implementing step 530 is applicable in the present context of set points (expressed as a percentage) allowing control of controlled appliances.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller for proportionally adjusting a respective light intensity of a plurality of lighting devices, the environment controller comprising:
   a communication interface; and
   a processing unit for:
      determining a current light intensity for each one of the plurality of lighting devices;
      determining a current average light intensity of the plurality of lighting devices by calculating the average of the current light intensities;
      receiving a target average light intensity of the plurality of lighting devices from a computing device via the communication interface or from a user via a user interface of the environment controller; and
      calculating a new light intensity for each one of the plurality of lighting devices by proportionally adjusting the light intensity of each one of the plurality of lighting devices from its respective current light intensity to its respective new light intensity so that the average of the new light intensities is equal to the target average light intensity of the plurality of lighting devices, the proportional adjustment being performed by an algorithm which calculates each new light intensity based at least on the corresponding current light intensity, the current average light intensity of the plurality of lighting devices and the target average light intensity of the plurality of lighting devices.

2. The environment controller of claim 1, wherein the processing unit further transmits the new light intensities to one or more light controller via the communication interface, the one or more light controller controlling the plurality of lighting devices.

3. The environment controller of claim 1, wherein the current light intensity and the new light intensity are expressed as a percentage for each one of the plurality of lighting devices.

4. The environment controller of claim 3, wherein the target average light intensity $A_t$ is lower than the current average light intensity $A_c$ and the adjustment from the current light intensity $I_c$ to the new light intensity $I_n$ is calculated as follows: $I_n = I_c + I_c * (A_t - A_c)/A_c$.

5. The environment controller of claim 1, wherein the processing unit transmits the current average light intensity to the computing device via the communication interface; and the target average light intensity is received from the computing device via the communication interface.

6. The environment controller of claim 1, wherein the processing unit displays the current average light intensity on a display of the environment controller; and the target average light intensity is received from the user via the user interface of the environment controller.

7. A method for proportionally adjusting a respective light intensity of a plurality of lighting devices, the method comprising:
   determining by a processing unit of an environment controller a current light intensity for each one of the plurality of lighting devices;
   determining by the processing unit of the environment controller a current average light intensity of the plurality of lighting devices by calculating the average of the current light intensities;
   receiving by the processing unit of the environment controller a target average light intensity of the plurality of lighting devices from a computing device via a communication interface of the environment controller or from a user via a user interface of the environment controller; and
   calculating by the processing unit of the environment controller a new light intensity for each one of the plurality of lighting devices by proportionally adjusting the light intensity of each one of the plurality of lighting devices from its respective current light intensity to its respective new light intensity so that the average of the new light intensities is equal to the target average light intensity of the plurality of lighting devices, the proportional adjustment being performed by an algorithm which calculates each new light intensity based at least on the corresponding current light intensity, the current average light intensity of the plurality of lighting devices and the target average light intensity of the plurality of lighting devices.

8. The method of claim 7, wherein the environment controller comprises the communication interface and the method further comprises transmitting by the processing unit of the environment controller via the communication interface of the environment controller the new light intensities to one or more light controller, the one or more light controller controlling the plurality of lighting devices.

9. The method of claim 7, wherein the current light intensity and the new light intensity are expressed as a percentage for each one of the plurality of lighting devices.

10. The method of claim 9, wherein the target average light intensity $A_t$ is lower than the current average light intensity $A_c$ and the adjustment from the current light intensity $I_c$ to the new light intensity $I_n$ is calculated as follows: $I_n = I_c + I_c * (A_t - A_c)/A_c$.

11. The method of claim 7, further comprising transmitting by the processing unit of the environment controller the current average light intensity to the computing device via the communication interface of the environment controller; and the target average light intensity is received from the computing device via the communication interface of the environment controller.

12. The method of claim 7, further comprising displaying by the processing unit of the environment controller the current average light intensity on a display of the environment controller; and the target average light intensity is received from the user via the user interface of the environment controller.

13. A non-transitory computer program product comprising instructions executable by a processing unit of an environment controller, the execution of the instructions by the processing unit of the environment controller providing for adjusting a respective light intensity of a plurality of lighting devices by:
  determining by a processing unit of an environment controller a current light intensity for each one of the plurality of lighting devices;
  determining by the processing unit of the environment controller a current average light intensity of the plurality of lighting devices by calculating the average of the current light intensities;
  receiving by the processing unit of the environment controller a target average light intensity of the plurality of lighting devices from a computing device via a communication interface of the environment controller or from a user via a user interface of the environment controller; and
  calculating by the processing unit of the environment controller a new light intensity for each one of the plurality of lighting devices by proportionally adjusting the light intensity of each one of the plurality of lighting devices from its respective current light intensity to its respective new light intensity so that the average of the new light intensities is equal to the target average light intensity of the plurality of lighting devices, the proportional adjustment being performed by an algorithm which calculates each new light intensity based at least on the corresponding current light intensity, the current average light intensity of the plurality of lighting devices and the target average light intensity of the plurality of lighting devices.

14. The computer program product of claim 13, wherein the current light intensity and the new light intensity are expressed as a percentage for each one of the plurality of lighting devices, the target average light intensity $A_t$ is lower than the current average light intensity $A_c$ and the adjustment from the current light intensity $I_c$ to the new light intensity $I_n$ is calculated as follows: $I_n = I_c + I_c * (A_t - A_c)/A_c$.

15. A method for proportionally adjusting a respective set point of a plurality of controlled appliances, the method comprising:
  determining by a processing unit of an environment controller a current set point for each one of the plurality of controlled appliances;
  determining by the processing unit of the environment controller a current average set point of the plurality of controlled appliances by calculating the average of the current set points;
  processing by the processing unit of the environment controller the current average set point of the plurality of controlled appliances;
  receiving by the processing unit of the environment controller a target average set point of the plurality of controlled appliances from a computing device via a communication interface of the environment controller or from a user via a user interface of the environment controller; and
  calculating by the processing unit of the environment controller a new set point for each one of the plurality of controlled appliances by proportionally adjusting the set point of each one of the plurality of controlled appliances from its respective current set point to its respective new set point so that the average of the new set points is equal to the target average set point of the plurality of controlled appliances, the proportional adjustment being performed by an algorithm which calculates each new set point based at least on the corresponding current set point, the current average set point of the plurality of controlled appliances and the target average set point of the plurality of controlled appliances.

16. The method of claim 15, wherein the current set point and the new set point are expressed as a percentage for each one of the plurality of controlled appliances.

17. The method of claim 16, wherein the target average set point $A_t$ is lower than the current average set point $A_c$ and the adjustment from the current set point $SP_c$ to the new set point $SP_n$ is calculated as follows: $SP_n = SP_c + SP_c * (A_t - A_c)/A_c$.

18. The method of claim 15, further comprising transmitting by the processing unit of the environment controller the current average set point to the computing device via the communication interface of the environment controller; and the target average set point is received from the computing device via the communication interface of the environment controller.

19. The method of claim 15, further comprising displaying by the processing unit of the environment controller the current average set point on a display of the environment controller; and the target average set point is received from the user via the user interface of the environment controller.

* * * * *